United States Patent Office 3,268,359
Patented August 23, 1966

3,268,359
ABLATIVE COATINGS
Gerald C. Boyd, Midland, and Milton C. Murray, Bay City, Mich., assignors to Dow Corning Corporation, Midland, Mich., a corporation of Michigan
No Drawing. Filed Oct. 1, 1962, Ser. No. 227,591
6 Claims. (Cl. 117—132)

This invention relates to the use of phenyl-containing organosiloxane elastomers as ablative coatings.

Ablative coatings are used in various portions of aerospace vehicles and their general function is to provide a cooling mechanism whereby the skin of the missile is not deleteriously affected by the high temperatures encountered. These temperatures occur when the missile passes at high speed through the atmosphere and in those portions of the missile which are exposed to the flame of the motor. In the latter, the outside of the nozzles, the rear end of the missile and the inside of the fuel compartment are subject to rapid deterioration by the flame unless they are protected by an ablative coating.

It is an object of this invention to provide a superior ablative coating for use at temperatures above 3,000° F. which coating can be conveniently applied to the surface of the missile without the necessity of using solvent and which gives excellent protection to the surface of the missile. Other objects and advantages will be apparent from the following description.

This invention relates to a method for protecting surfaces of aerospace vehicles from the eroding effect of gases at temperatures above 3,000° F. which comprises coating said surfaces with a composition consisting essentially of a methylphenylpolysiloxane having about two total methyl and phenyl groups per silicon atom in which the ratio of phenyl radicals to silicon atoms ranges from .25:1 to 1.25:1 and thereafter curing the composition.

It is essential for the operativeness of the coatings of this invention that they contain at least .25 phenyl radical per silicon atom. As can be seen, the materials employed in this invention are essentially diorganosiloxanes in which the siloxane units are dimethylsiloxane units, phenylmethylsiloxane units and diphenylsiloxane units in such proportion that the ratio of phenyl groups to silicon atoms falls within the above range. Thus, it can be seen that the polysiloxanes of this invention can be a homopolymer of phenylmethylsiloxane or a copolymer of dimethylsiloxane and phenylmethylsiloxane, a copolymer of dimethylsiloxane and diphenylsiloxane, a copolymer of phenylmethylsiloxane and diphenylsiloxane and a copolymer containing all three types of units.

The term "consisting essentially of" means that the essential characteristics of the compositions of this invention are imparted by the above-defined siloxanes, but that the polymer can also contain small amounts of other siloxane units such as vinylmethylsiloxane to improve the vulcanizability of the rubber or other siloxanes which do not deleteriously affect the essential characteristics of the siloxane.

Preferably, the siloxanes of this invention contain fillers which aid in stabilizing the composition. These fillers include inorganic materials such as fume silica, silica aerogel, diatomaceous earth, crushed quartz, sand, and silicates such as aluminum silicate, aluminum magnesium silicate, clay, and zirconium silicate and metal oxides such as $TiO_2$, ferric oxide and the like. It can be seen, therefore, that the fillers employed in this invention are the conventional inorganic fillers normally used in organosiloxane elastomers.

The compositions of this invention can be applied to the missile skin by any convenient method and thereafter cured by heating or by allowing it to cure at room temperature. The thickness of the coating varies depending upon the heat flux to be encountered during use. Ordinarily the greater the heat flux, the thicker the coating.

The method by which the organosiloxane elastomer is cured is not important since they may be cured by the use of peroxides such as benzoyl peroxide, t-butyl perbenzoate, ditertiary butyl peroxide, dichlorobenzoyl peroxide or dicumyl peroxide or they can be cured by subjecting the coating to electromagnetic radiation or electron radiation or they can be of the so-called room temperature curing type. The latter as is well known, fall into three main classes; namely, those cured by incorporating alkyl silicates and suitable catalysts, those cured by incorporating SiH compounds and vinyl on silicon in the presence of a platinum catalyst and the so-called one component room temperature curing elastomers in which the molecule contains a plurality of hydrolyzable groups such as acetoxy or oxime groups which react with the moisture of the atmosphere to cause curing of the siloxane.

The precise amount of filler employed in the polymers is not critical and it varies depending upon the precise function of the ablative coating. Smaller amounts of filler can be used when rapid ablation is desired to give the maximum cooling. Larger amounts of filler are used when smaller ablation is desired, such as, for example, when one desires to protect sensitive instruments from the heat.

The following examples are illustrative only and should not be construed as limiting the invention which is properly delineated in the appended claims.

*Example 1*

The effectiveness of the compositions of this invention as ablative coatings was shown by subjecting samples of the cured elastomeric compositons to the flame of a kerosene-oxygen torch adjusted to give a reducing flame having a temperature of between 5,000° F. and 6,000° F. and a velocity of about 5,500 feet per second. This subjects the sample to high temperature and to the eroding effects of the high velocity gas. Various compositions were compounded into the formulation shown below and in each case the composition was cured into a slab about 1.5 x 3 inches. The composition was vulcanized and the sample subjected to the flame of the torch and the mass loss in grams per second and the penetration of the flame in mils per second were determined in each case.

The results are shown in the table below.

*Sample 1.*—100 parts [1] of a copolymer of 70 mol percent dimethylsiloxane and 30 mol percent phenyl-methylsiloxane, 36 parts of a fume silica, 6 parts of titanium dioxide, 25 parts diatomaceous earth and 1.8 parts of 2,4-dichlorobenzoyl peroxide. This sample was prepared by milling the above ingredients until a uniform mass was obtained.

*Sample 2.*—Sample 2 was the same as Sample 1 except that the polymer was 100 mol percent phenylmethylsiloxane.

*Sample 3.*—Sample 3 was a mixture of 100 parts of a copolymer of 70 mol percent dimethylsiloxane and 30 mol percent phenylmethylsiloxane, 95 parts of aluminum silicate, 20 parts of ferric oxide and .8 part of benzoyl peroxide.

*Sample 4.*—Sample 4 was a mixture of 100 parts of a copolymer of 15 mol percent diphenylsiloxane, 84.858 mol percent dimethylsiloxane and .142 mol percent methylvinylsiloxane, 35 parts fume silica, 8 parts of a hydroxylated dimethylsiloxane having a viscosity of about 35 cs., 25 parts diatomaceous earth, 1 part of a mixture of 20 percent ethyl borate and 80 percent dimethylpolysiloxane gum, 3 parts ceric hydroxide and 1.85 parts of 2,4-diclorobenzoyl peroxide.

[1] All parts are parts by weight.

*Sample 5.*—Sample 5 which is given for comparison was identical with Sample 1 except that the polymer was a copolymer of 92.5 mol percent dimethylsiloxane and 7.5 mol percent phenylmethylsiloxane.

TABLE I

| Sample | Mass loss rate in grams per second [1] | Penetration in mils per second [2] |
|---|---|---|
| 1 | .32 | 10 |
| 2 | .5 | 8 |
| 3 | .26 | 9.9 |
| 4 | .57 | 23 |
| 5 | 2.5 | 51 |

[1] Obtained by dividing the total weight loss in g. by the time in seconds.
[2] Obtained by dividing the total penetration in mils by the time in seconds.

*Example 2*

Equivalent results are obtained when the following copolymers are substituted in Sample 1 of Example 1:

A copolymer of—
    10 mol percent diphenylsiloxane and
    90 mol percent phenylmethylsiloxane.

A copolymer of—
    10 mol percent diphenylsiloxane,
    30 mol percent phenylmethylsiloxane,
    59.9 mol percent dimethylsiloxane and
    .1 mol percent methylvinylsiloxane.

That which is claimed is:

1. A method of protecting the surfaces of an aerospace vehicle from the eroding effect of gases at temperatures about 3,000° F. which comprises coating said surfaces with a composition consisting essentially of a methylphenylpolysiloxane elastomer in which the ratio of phenyl radicals to silicon atoms ranges from .25:1 to 1.25:1 inclusive and in which the total number of phenyl and methyl radicals per silicon is about 2 and thereafter curing the composition.

2. The method in accordance with claim 1 in which the siloxane elastomer is a copolymer of phenylmethylsiloxane and dimethylsiloxane.

3. The method in accordance with claim 1 in which the siloxane elastomer is a copolymer of 30 mol percent pehnylmethylsiloxane and 70 mol percent dimethylsiloxane.

4. The method in accordance with claim 1 in which the compositon contains a filler.

5. In a method of protecting aerospace vehicle surfaces from gases having a temperature above 3000° F., the improvement comprising coating the aerospace vehicle surfaces with a composition consisting essentially of a methylphenylpolysiloxane elastomer in which the ratio of phenyl radicals to silicon atoms ranges from 0.25:1 to 1.25:1 inclusive, and in which the total number of phenyl and methyl radicals per silicon atom is about two, and thereafter curing the composition.

6. In a method of protecting a skin of a missile from temperatures of above 3000° F. when passing through an atmosphere at high speed, the improvement comprising coating the skin of a missile with a composition consisting essentially of a methylphenylpolysiloxane elastomer in which the ratio of phenyl radicals to silicon atoms ranges from 0.25:1 to 1.25:1 inclusive, and in which the total number of phenyl and methyl radicals per silicon atom is about two, and thereafter curing the composition.

References Cited by the Examiner

UNITED STATES PATENTS

| | | | |
|---|---|---|---|
| 2,442,212 | 5/1948 | Rochow. | |
| 2,473,887 | 6/1949 | Jennings et al. | |
| 2,480,620 | 8/1949 | Warrick | 260—46.56 |
| 2,563,005 | 8/1951 | Clark. | |
| 2,608,499 | 8/1952 | Straka. | |
| 2,838,472 | 6/1958 | Lucas | 260—46.56 |
| 2,871,141 | 1/1959 | Van Deusen | 117—132 |
| 3,006,403 | 10/1961 | Cooper at al. | |

OTHER REFERENCES

Milan E. Groby and W. S. Jessop: Chemical Specialties Mfrs. Assoc. Proc. 47th Mid-Year Meeting, May 1961, pp. 98–101, Chemical Abstracts 56:2542i, 2543a.

Brenner et al.: High Temperature Plastics, Reinhold Publishing Corporation, 1962, received in Patent Office Apr. 27, 1962, pp. 7, 8, 19, 26, and 27. TP 986 A2 B75.

Space/Aeronautics, Ablative Re-Entry Cooling, February 1962, pp. 64–69. TL501A38.

ALFRED L. LEAVITT, *Primary Examiner*.

WILLIAM D. MARTIN, RICHARD D. NEVIUS,
                              *Examiners.*

R. S. KENDALL, *Assistant Examiner.*

UNITED STATES PATENT OFFICE
CERTIFICATE OF CORRECTION

Patent No. 3,268,359                          August 23, 1966

Gerald C. Boyd et al.

It is hereby certified that error appears in the above numbered patent requiring correction and that the said Letters Patent should read as corrected below.

Column 3, line 34, for "about" read -- above --.

Signed and sealed this 26th day of September 1967.

(SEAL)
Attest:

ERNEST W. SWIDER                               EDWARD J. BRENNER
Attesting Officer                                      Commissioner of Patents